Patented Oct. 16, 1951

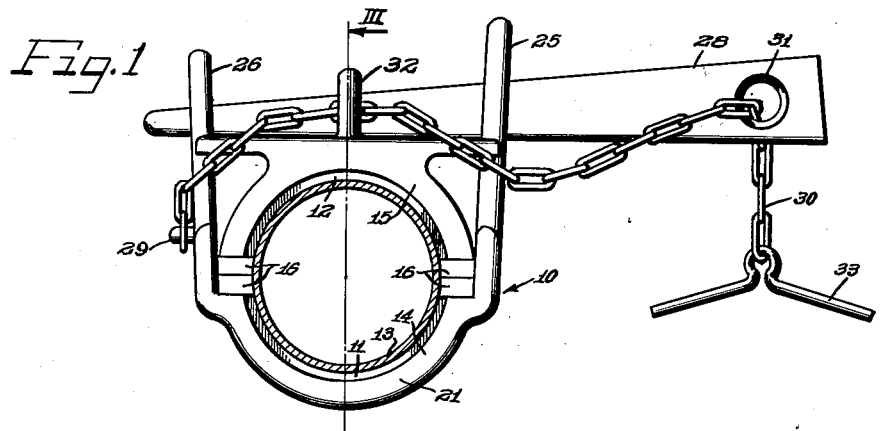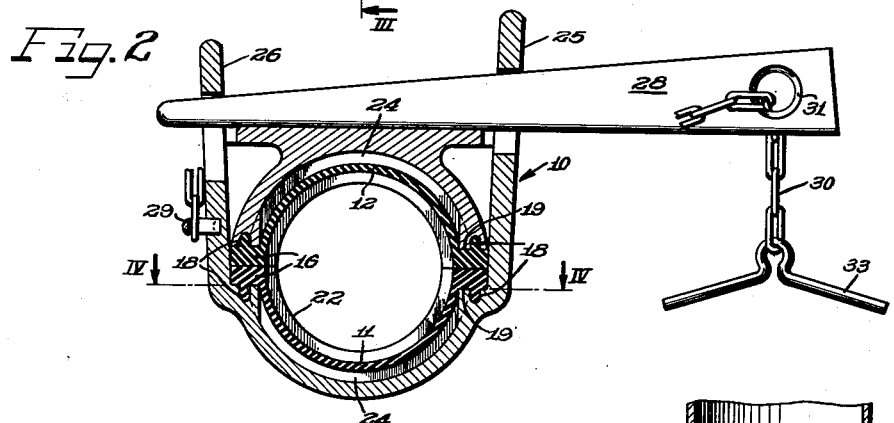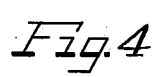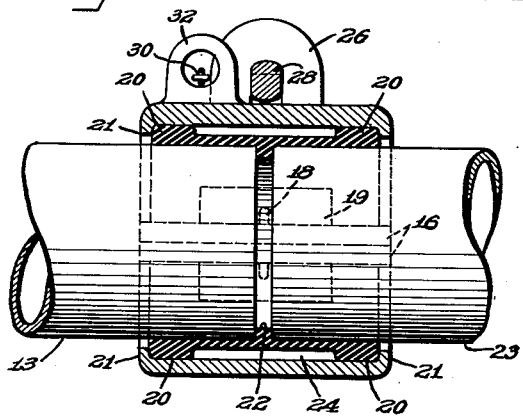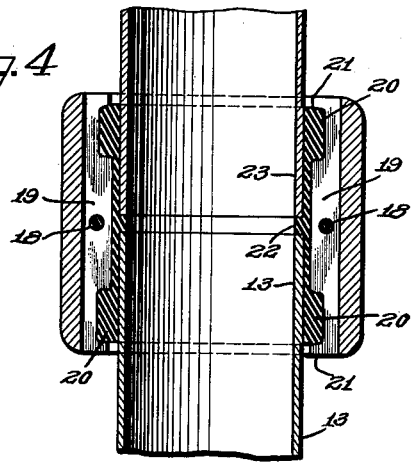

2,571,348

UNITED STATES PATENT OFFICE 2,571,348

COUPLING GASKET

Charles M. Drinkwater, Jr., Lake Bluff, Ill., assignor to Drinkwater, Inc., Waukegan, Ill., a corporation of Illinois Application September 23, 1948, Serial No. 50,863

14 Claims. (Cl. 285—194)

1

This invention relates to pipe coupling gaskets and more particularly to a gasket which, beside providing flexibility at joints in coupled pipes, provides a smooth resilient seal at pipe joints and protection for pipe ends.

In usual practice, pipe runs are composed of a plurality of pipe lengths joined by threading pipe ends into rigid threaded couplings. In my Patent 2,437,246 for a flexible pipe coupling, issued on March 9, 1948, however, I have described a coupling which does not require threaded pipe ends and which has the advantages of flexibility and portability, serving the needs of some applications never fully satisfied by prior art devices.

My present invention relates to a coupling somewhat similar to the type so described but having certain improvements and an associated gasket making it adaptable to many more applications not satisfied by prior art devices.

One of the usual difficulties presented by prior art pipe couplings is that they create a discontinuity in the fluid flow path which increases resistance and effectively reduces the freedom of flow. Such discontinuities also act to restrain the flow of small solid particles and encourage the building up of such particles into piles which further restrain the flow of fluid. The building up of particles is particularly undesirable in the use of pipe lines for transfer of solids mixed with liquid as is frequently necessary in the food industry. Glass lined pipe is often used for transfer of such materials, but one of the difficulties encountered with pipe lines of this type is that strain and abrasive action of abutting pipe ends cause chipping of the pipe and creation of contaminating particles within the fluid being transferred.

It is an object of my present invention to provide a pipe coupling and associated gasket having a pipe spacer ridge which will give pipe joints a smooth continuous inner surface to effectively minimize the reduction of pressure drop of fluid flowing across the joint.

It is another object of my present invention to provide a pipe coupling and associated gasket which will eliminate discontinuities and obstructions on the inner surface of the joint of the pipe which tend to facilitate building up of particles flowing with the fluid.

Still another object of my present invention is to provide a pipe coupling gasket which enables a considerable degree of flexibility at pipe joints.

A further object of my present invention is to provide a pipe coupling gasket adapted to be removably mounted within a coupling in a manner which will facilitate easy replacement.

2

A still further object of my present invention is to provide a novel pipe coupling and associated gasket which will securably clamp threaded or unthreaded end portions of adjacent pipe lengths in pipe lines so that stress and strain and abrasive action between abutting ends of pipe lines are substantially eliminated.

The novel features which I believe to be characteristic of my invention are set forth with particularity in the appended claims. My invention, however, as to its organization, manner of construction, and method of operation, together with further objects and advantages thereof may be best understood by reference to the following description taken in connection with the accompanying drawings, in which:

Figure 1 is an elevational end view of an assembled coupling and gasket embodying the principles of my invention shown clamped about a sectionalized portion of pipe;

Figure 2 is a cross-sectional elevational view across the width of the coupling of Figure 1 taken at a point midway between its ends;

Figure 3 is a partial sectionalized view of the coupling gasket and pipe as taken on line III—III of Figure 1; and Figure 4 is a sectionalized view of the coupling with its gasket clamping two pipe ends as taken on line IV—IV of Figure 2.

As shown on the drawings:

Referring now more particularly to the drawings in which like numerals designate like parts in the various figures, coupling 10 is shown assembled and fitted with its two-piece gasket, consisting of semi-circular gasket members 11 and 12, securably holding the end portions of circular pipe 13. It is a feature of my invention that the coupling members 11 and 12 do not directly hold the pipe ends in jointed relation, but rather, that the two-piece gasket fitted to the coupling members provides the gripping action necessary to effect a tightly sealed point. The coupling 10 includes a lower arcuate member 14 fitted with the gasket member 11 while a mating upper arcuate member 15 is fitted with the gasket member 12. The arcuate members 14 and 15 when mated together without gaskets do not form a circular inner surface proper for holding the pipe ends, but when the gasket members 11 and 12 are fitted in place, sealing flanges 16 extending from each longitudinal edge of the gaskets 11 and 12 overlap the end faces of the arcuate members 14 and 15 causing the flanges to act somewhat like spacers so that when the arcuate members are assembled, their general configuration is that of a circle about the circular inner periphery provided by the gasket members.

Another feature of my invention lies in the manner in which the gasket pieces are fitted to their respective arcuate members. A small projecting prong 18 is provided in the end face contact surface of each sealing flange 16 at a point midway between its ends. A corresponding mating hole is provided in the end faces of each arcuate member 14 and 15 at a point midway between its ends. The prongs serve three main purposes: first, they enable proper location of the gaskets when fitting them to the arcuate members; secondly, they provide a slight frictional engagement due to the close fit within their mating holes and thus enable the arcuate members to be turned upside down during the assembly procedure without fear that the fitted gaskets will drop from place; and thirdly, they provide a transverse holding action which prevents the gasket flanges from being pulled from place while gripping jointed pipe ends.

Since the wall of each arcuate member 14 and 15 is not sufficiently thick in itself to allow drilling of holes in its end faces for prongs 18, an additional thickness is provided by a small end face extension 19 projecting from the inner periphery of the arcuate members. These projections, besides providing additional end face areas to allow drilling of the mating holes, also serve to properly locate the gasket members during fitting operations, since the projections are made sufficiently wide to fit closely between the gasket seating ridges 20, provided across the outer circumference of the gasket ends, as shown in Figures 3 and 4. These projections, in addition, provide added gripping surface for the gasket sealing flanges 16 and also prevent the gasket from being displaced longitudinally when in fitted position. Longitudinal displacement is further prevented by turned up lips 21 on the inner edge of each end of the arcuate members 14 and 15.

Another feature of the gasket lies in the provision of a circular buffer ridge 22 projecting from the inner periphery of the gasket, midway between its ends. This ridge acts both as a spacer and filler between confronting pipe ends held by the gasket. Thus when fluids are flowing across the joint, no gap is presented between the pipe ends, but a smooth continuous surface is provided by the flat top of the buffer ridge which extends across the inner edge of the confronting pipe ends, in flush relationship thereto. The sides of the buffer ridge 22 are perpendicular to the inner gasket surface and substantially equal in height to the thickness of pipe which the coupling is designed to hold. Thus, when the confronting pipe ends 13 and 23 are clamped within the gasket, the ridge 22 serves as a separator preventing the two ends from making direct contact with each other by allowing the pipe ends to be inserted into the coupling gasket only as far as one side of the buffer ridge. Any flexure of the pipes at the joint therefore is prevented from causing direct contact of pipe ends and chipping due to the abrasive abutting of the ends against each other.

Because the gasket is made of resilient material such as rubber or a similar composition, it has a certain amount of give which enables flexure of the pipe without further provisions being made therefor, but to enable even greater flexibility, the gasket is designed so as to have a pocket space 24 between the inner surface of each of the arcuate coupling members and the outer surface of the gasket fitted therein. Each pocket space is bounded at its side by the seating ridges 20 and at its ends by the projections 19 on the inner surface of the arcuate member 15, thus sufficient room is provided under the gasket wall portions adjacent each clamped pipe end to allow flexure of the pipe joint until the end edges of the pipe press the gasket wall tightly against the inner surfaces of the arcuate coupling members.

By way of example, such flexibility in a practical embodiment may be in the order of 30° from a straight line, but this is not limiting since the flexibility may be varied by increasing or decreasing the size of the gasket seating ridges 20 to vary the amount of pocket space 24.

Clamping of the arcuate coupling members 14 and 15 in assembled relationship is effected by two slotted ear members 25 and 26, each provided with a slot extending upward from the edges of the lower arcuate member 14 a distance above the top of the mated arcuate member 15, across which a wedge key 28 may be passed through the slots in ears 25 and 26 to tightly clamp the upper member 15 to the lower member 14. At one side of the ear 26 is an eyelet 29 to which a length of chain 30 of suitable cable may be secured after being threaded through a hole 31 at the wider end of wedge piece 28 and through another eyelet 32 formed on the top of the upper arcuate member 15. A pronged handle 33 is secured to the outer or free end of chain member 30 whereby the whole coupling unit may be grasped and carried out. The handle 33 is also made large enough to prevent it from being pulled through the hole 31, thus preventing the separation of parts of the coupling.

In actual operation, the disassembled coupling parts are quickly assembled to form a pipe joint by first inserting the gasket pieces 11 and 12 into their respective arcuate coupling members 14 and 15. The lower arcuate member 14 is then placed into position to accommodate the two pipe ends 13 and 14 as shown in Figure 4. The pipe ends confront each other in abutting relationship to the buffer ridge 22 but do not actually touch each other. The upper arcuate member 15 is then put in place over the two confronting pipe ends, after first making sure that the upper portion of the buffer ridge 22 is properly disposed between the two upper edges of the pipe ends. The wedge key 28 is then inserted in slots 26 and 25, respectively, across the top of arcuate member 15 and may be driven by means of a small sledge hammer. As the upper and lower arcuate members are clamped tighter together, a vise-like action is exerted by the end faces of arcuate members 14 and 15, causing the gasket flanges 16 to be squeezed into smaller space. The wall portions of the gasket members 11 and 12 extending between the sealing flanges are thereby tightly drawn about the outer peripheries of the pipe ends 23 and 13 and by reason of the force thus exerted on the flanges 16, a very tight seal totally surrounding the pipe ends is effected. If an attempt is then made to withdraw the pipe from the coupling end, the frictional relationship between the gasket and pipe ends is found to be sufficient to oppose withdrawal. The coupling unit may be correspondingly quickly disassembled by merely tapping the wedge key 28 from position, thereby releasing the grip of the gasket members 11 and 12 to allow withdrawal of the pipe ends.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A pipe coupling gasket member formed of a length of resilient material, said gasket length having a continuous transverse pipe spacer ridge projecting from its inner periphery to prevent direct contact of coupled pipe ends and to effect a uniformly smooth sealed inner transition surface between such coupled pipes.

2. A pipe coupling gasket member formed of a length of resilient material, said member having a pair of seating ridges projecting from the ends of its outer periphery and pocket space between said seating ridges on said outer periphery wherein the portion of said gasket member distorted by pipe ends may move when coupled pipes are aligned other than straight thereby providing greater flexibility for said gasket member.

3. A pipe coupling gasket member formed of a length of resilient material, said gasket member having a flat channel provided on its outer periphery, said channel having its length defined by the side edges of said gasket member and its width by points equi-distant from each end, thereby providing room on the outer periphery of said gasket for the walls of said gasket pushed by pipe ends when the alignment of pipe members gripped by said gasket member is other than straight.

4. A pipe coupling gasket member comprising a cylindrical length of resilient material, said gasket member having a transverse seating ridge disposed about each end of its outer periphery and a transverse pipe spacer ridge disposed about its inner periphery midway between the ends of said gasket member for preventing direct contact of coupled pipe ends.

5. A resilient pipe coupling gasket member comprising a length of semi-circular material having a uniform continuous transverse pipe spacer ridge disposed on its inner periphery for preventing direct contact of coupled pipe ends and sealing flanges disposed along each outer side edge, each of said flanges having a mounting prong provided thereon for providing additional gripping surface for said sealing flange.

6. A resilient pipe coupling gasket member comprising a length of semi-circular material having a seating ridge projection transversely disposed across each end of its outer periphery, a uniform continuous transverse spacer ridge disposed on its inner periphery for preventing direct contact of coupled pipe ends and a mounting prong along each of its outer side edges.

7. In a pipe coupling comprising two associated arcuate members, a corresponding pair of identical semi-circular resilient gasket members adapted to be assembled in cylindrical relationship and removably fitted within the concave portions of said arcuate members, said gasket members each having seating ridge projections disposed about the ends of its outer periphery and a space channel between said seating ridges on said outer periphery, whereby pipe-end space is provided between said gasket member and the one of said arcuate members within which it is fitted when alignment of the pipe members within said gasket members is other than straight.

8. In a pipe coupling comprising a pair of cooperating arcuate members, a semi-circular resilient gasket member fitted within each of said arcuate coupling members, sealing flanges disposed along each outer side edge of said gasket members, each of said sealing flanges being arranged to overlap a side face portion of the arcuate member with which it is associated, and mounting prongs projecting from said sealing flanges for properly locating and removably securing said gasket members within said arcuate coupling members.

9. In a pipe coupling comprising two associated arcuate members, a corresponding pair of identical semi-circular resilient gasket members adapted to be removably secured to the concave portions of said arcuate members, said gasket members each having seating ridges disposed about the ends of its outer periphery and a space channel between, and projections uniform in cross-section throughout their lengths protruding from said concave surfaces arranged to be fitted between the portions of said seating ridges at the ends of said space channel to prevent said gasket member from being displaced longitudinally when in a fitted position.

10. In a pipe coupling comprising two cooperating arcuate members, a semi-circular resilient gasket member removably mounted within each of said coupling members, said gasket members each having seating ridges disposed about the ends of its outer periphery with a channel space between, said arcuate members each having projecting portions disposed on its concave surfaces and having a width substantially equal to the width of said channel thereby enabling said projections to fit within said channel to prevent longitudinal movement of said gasket member within its respective arcuate member.

11. In a coupling for pipe ends, a pair of cooperating arcuate members for coupling the pipe ends and a pair of semi-cylindrical resilient gasket members fitted within said arcuate members, said gasket members having an annular seating ridge at each end of their outer periphery for seating said arcuate members and each of said gasket members having an inwardly disposed annular spacer ridge midway between their ends for preventing direct contact of the pipe ends fitted within said gaskets.

12. In a pipe coupling, a pair of cooperating arcuate members for coupling pipe ends, a semi-cylindrical resilient gasket member fitted within each of said arcuate members, each of said gasket members having an annular seating ridge disposed about each end of its outer periphery for seating the corresponding arcuate member, said ridges defining therebetween a spacing channel whereby space for the accommodation of the pipe ends is provided when alignment of pipe members within said gasket members is other than straight for providing greater flexibility for said gasket members, and said gasket members having an annular spacer ridge disposed inwardly and midway between the ends of said gasket members for preventing direct contact of the pipe ends fitted within said gaskets.

13. In a pipe coupling a pair of cooperating arcuate members for coupling pipe ends, a semi-cylindrical resilient gasket member fitted within each of said arcuate members, said gasket members having an annular seating ridge at each end of its outer periphery for seating the corresponding arcuate members, said ridges defining therebetween a spacing channel whereby space for the accommodation of pipe ends is provided when alignment of pipe members within said gaskets is other than straight for providing greater flexibility for said gasket members, a sealing flange disposed along the outer side edge of said gasket members and arranged to overlap a side face portion of the arcuate member with which it is associated, mounting prongs projecting from said sealing flange for properly locating and removably securing said gasket members within said arcuate members, and said gasket members having an annular pipe spacer ridge disposed inwardly and midway between the ends of said gasket members for preventing direct contact of the pipe ends fitted within said gaskets.

14. In a pipe coupling, a pair of cooperating arcuate members for coupling the pipe ends, a pair of semi-cylindrical resilient gasket members fitted within said arcuate members, said gasket members having an annular seating ridge at each end of their outer periphery for seating said arcuate members, said ridges defining therebetween a spacing channel whereby space for the accommodation of pipe ends is provided when alignment of pipe members within said gasket members is other than straight for providing greater flexibility for said gasket members, a sealing flange disposed along the outer side edge of said gasket members and arranged to overlap a side face portion of the arcuate member with which it is associated, mounting prongs projecting from said sealing flange for properly locating and removably securing said gasket members within said arcuate members, projections from said arcuate members arranged to be fitted between the portions of said seating ridges at one end of said space channel to prevent said gasket members from being displaced longitudinally when in a fitted position, and said gasket members having an annular spacer ridge disposed inwardly and midway between their ends for preventing direct contact of the pipe ends fitted within said gaskets.

CHARLES M. DRINKWATER, Jr.

REFERENCES CITED

The following references are of record in the file of this patent:

UNITED STATES PATENTS

| Number | Name | Date |
|---|---|---|
| 617,251 | Israel | Jan. 3, 1899 |
| 1,628,132 | Farnstrom | May 10, 1927 |
| 1,940,729 | Pfefferle | Dec. 26, 1933 |
| 2,184,376 | Beyer | Dec. 26, 1939 |
| 2,463,235 | Andrews | Mar. 1, 1949 |